United States Patent [19]

Masui et al.

[11] Patent Number: 5,053,179
[45] Date of Patent: Oct. 1, 1991

[54] PROCESS FOR PRODUCING A MULTILAYER MOLDED ARTICLE

[75] Inventors: Syohei Masui, Kyoto; Masahito Matsumoto, Ibaraki; Nobuhiro Usui, Takatsuki, all of Japan

[73] Assignee: Sumitomo Chemical Company, Limited, Osaka, Japan

[21] Appl. No.: 283,930
[22] PCT Filed: Apr. 30, 1988
[86] PCT No.: PCT/JP88/00438
§ 371 Date: Nov. 29, 1988
§ 102(e) Date: Nov. 29, 1988
[87] PCT Pub. No.: WO88/08364
PCT Pub. Date: Nov. 3, 1988

[30] Foreign Application Priority Data

Apr. 30, 1987 [JP] Japan ................................ 62-109509

[51] Int. Cl.⁵ ...................... B29C 33/14; B29C 43/18; B32B 27/06
[52] U.S. Cl. ................................... 264/257; 264/275; 264/278; 264/279
[58] Field of Search ............... 264/259, 511, 275, 277, 264/278, 279, 257

[56] References Cited

U.S. PATENT DOCUMENTS 2,797,179  6/1957  Reynolds et al. .................... 264/257

FOREIGN PATENT DOCUMENTS

| | | | |
|---|---|---|---|
| 43-3985 | 2/1968 | Japan | 264/259 |
| 56-118835 | 9/1981 | Japan | 264/259 |
| 57-53322 | 3/1982 | Japan . | |
| 60-73824 | 4/1985 | Japan | 264/259 |
| 60-212312 | 10/1985 | Japan | 264/259 |
| 61-22914 | 1/1986 | Japan . | |
| 61-66619 | 4/1986 | Japan . | |
| 63-137713 | 6/1986 | Japan | 264/259 |
| 61-220822 | 10/1986 | Japan | 264/259 |
| 63-11312 | 1/1988 | Japan . | |
| 1156556 | 2/1969 | United Kingdom . | |
| 1150052 | 4/1969 | United Kingdom . | |

Primary Examiner—Leo B. Tentoni
Attorney, Agent, or Firm—Birch, Stewart, Kolasch & Birch

[57] ABSTRACT

The present invention provides a process for producing a multilayer molded article which includes supplying at least one piece of a skin material having a desired shape and a resin melt between unclosed upper and lower molds and closing the molds to form a multilayer molded article including the thermoplastic resin and the skin material which covers only a desired part of the article, wherein the resin melt is supplied at or near a center area of a rear face of the skin material, or wherein after the skin material is lifted to a position at which the skin material contacts a cavity surface of the upper mold by a vertically movable rod or bar which is positioned at a part of the lower mold on which the skin material is placed, the resin melt is supplied between the upper and lower molds and the rod or bar is returned to a determined position at least before the molding is completed. This process economically produces a multilayer molded article in which the skin material covers the desired part of the article without displacement and which has a good feeling.

11 Claims, 5 Drawing Sheets

PROCESS FOR PRODUCING A MULTILAYER MOLDED ARTICLE

FIELD OF THE INVENTION

The present invention relates to a process for producing a multilayer molded article comprising a thermoplastic resin and a skin material. More particularly, it relates to a process for producing a multilayer molded article comprising a thermoplastic resin and a skin material which covers a desired part of the article

DESCRIPTION OF THE RELATED ART

The above described multilayer molded article comprising the thermoplastic resin and the skin material which covers only a desired part of the article is used as a door trim or a rear trim of an automobile and the like. As a process for producing such multilayer molded article comprising the thermoplastic resin and the skin material which covers only the desired part of the article (hereinafter referred to as "skin material partially laminated article"), practically used are a process which comprises molding the thermoplastic resin by, for example, injection molding and laminating the skin material having a desired shape on the molded article with an adhesive and the like, and a process which comprises making a part by laminating the skin material on a hard board and attaching said part to the molded article with small screws and the like. These processes require post-processing of the article, which is troublesome and increases the production cost of the article.

As processes for integrally molding the skin material partially laminated article, Japanese Patent Publication No. 28704/1981 and Japanese Patent Kokai Publication No. 177332/1983 disclose processes for integrally producing a skin material partially laminated article by injection molding which comprise fixing the skin material at a desired position on an inner wall of a mold with a fastener or a magic band, closing the mold and then injecting the thermoplastic resin. These processes require special means for fixing the skin material to the mold. Further, since the resin melt is supplied after closing the mold, it flows at a very high flow rate in a very narrow clearance which corresponds to a difference between a thickness of the article and the thickness of the skin material, a rear face of the skin material receives a large shear rate so that the skin material tends to be easily displaced even though the fastener or the magic band is used. In addition, the skin material is largely influenced by heat, and after the supply of the resin melt, a large pressure is applied to the skin material in a dwell time so that grain pattern, texture, hand and feeling (hereinafter referred to as "feeling") of the skin material tend to be impaired.

DESCRIPTION OF THE INVENTION

As a result of the extensive study on a process for producing a skin material partially laminated article having good feeling without displacement of the skin material, it has been found that conditions for supplying the resin melt are important and the present invention has been completed.

Accordingly, the present invention provides a process for producing a multilayer molded article which comprises supplying at least one piece of a skin material having a desired shape and a resin melt between upper and lower molds and closing the molds to form a multilayer molded article, wherein the resin melt is supplied at or near a center area of a rear face of the skin material, or wherein after the skin material is lifted to a position at which the skin material contacts a cavity surface of the upper mold by a vertically movable rod or bar which is positioned at a part of the lower mold on which the skin material is placed, the resin melt is supplied between the upper and lower molds and the rod or bar is returned to a determined position at least before the molding is completed.

That is, the present invention provides a method for economically producing the skin material partially laminated article wherein the skin material is not moved and the article has good feeling by supplying the resin melt at or near the center area of rear face of the skin material through a passage for the resin melt provided in the upper or lower mold, or by lifting the skin material to the position at which the skin material contacts the cavity surface of the upper mold by the vertically movable rod or bar which is positioned at a part of the lower mold, supplying the resin melt between the upper and lower molds and then returning the rod or bar to the determined position at least before the completion of molding.

The process of the present invention will be illustrated by making reference to the accompanying drawings.

FIG. 1 shows a perspective view of a molded article produced by the process of the present invention, and FIG. 2 shows a cross sectional view of the article of FIG. 1 along the line A—A'. In the figures, numeral 1 stands for a multilayer molded article, 2 stands for a thermoplastic resin and 3 stands for a skin material.

FIGS. 3 to 14 show vertical cross sectional views of apparatuses for explaining the process of the present invention. In these figures, 6 and 8 stand for upper and lower platens of a mold closing machine, respectively, and 7 and 9 stand for upper and lower molds, respectively.

On a cavity surface of the lower mold 9, a shallow depression 10 is provided for determining a position on which the skin material 3 is placed.

By using such apparatus, the process of the present invention is carried out according to the following four steps:

1. The skin material 3 which has been cut to a desired size is placed with the surface down in the depression 10 of the lower mold 9.

2. A lifting mechanism (not shown) of the mold closing machine is actuated to lift the lower mold 9, and then the lower mold 9 is temporarily stopped at a position where the clearance between the cavity surfaces of the upper and lower molds 7 and 9 is larger than the thickness of the article to be molded. At said position, the resin melt 4 is supplied at or near the center area of the rear face of the skin material 3 through a resin passage (not shown) provided in the upper mold 7 by means of a conventional resin melt supplier (not shown) such as an extruder (FIG. 3).

3. Thereafter, the lifting mechanism is reactuated to further lift the lower mold 9 so as to press the skin material 3 against the lower mold 9 and spread the resin melt 4 in the mold cavity, whereby the skin material 3 and the thermoplastic resin 2 are integrated and the molding is completed (FIG. 4).

4. After cooling the mold, the lower mold 9 is lowered to open the upper and lower molds, and then the molded article 1 is removed from the mold.

In the process of the present invention, the timing for supplying the resin melt 4 is not limited to the above described timing, and the resin melt can be supplied at any time after the skin material 3 is placed on the lower mold 9 and before the upper and lower molds are closed to the final position. Namely, besides the timing at which the mold is stopped at the intermediate position, the resin melt can be supplied before the mold closing is started, or during a continuous closing of the mold without stopping, if desired, while decreasing the mold closing rate.

Preferably, the resin melt 4 is supplied when the mold closing action is temporarily stopped after the start of the mold closing or the mold closing rate is decreased to 30 mm/sec. or less, and the cavity clearance between the upper and lower molds 7 and 9 is not larger than (C+100) mm and not smaller than (C+5) mm wherein "C" represents the cavity clearance when the molding is completed. Thereby, the feeling of the skin material is maintained.

When the resin melt 4 is supplied through two or more passages, it is necessary to prevent confluence of the resin melt 4 from the passages on the skin material by adjusting an amount of the resin melt supplied from each passage based on the size and other properties of the skin material 3 so as to prevent penetration of the resin melt between the skin material 3 and the lower mold 9.

According to the process of the present invention, since the resin melt 4 is supplied at or near the center area of the rear face of the skin material when the clearance between the upper and lower molds is still large, the resin melt 4 flows over the skin material 3 at a small shear rate (stress) and spreads from the center area towards a periphery of the skin material. Therefore, the skin material 3 is hardly moved out of position.

During the supply of the resin melt 4, a larger clearance between the upper and lower molds is preferred to decrease the shear rate when the resin melt 4 flows over the skin material 3. However, if the clearance is too large, a shape of the supplied resin melt is deformed and therefore the resin melt 4 is non-uniformly spread, which may cause movement of the skin material. Further, it takes longer from the supply of the resin melt till the closing of the mold, so that the center area of the skin material 3 is heated for a longer period of time than other part and the feeling of the skin material 3 tends to be deteriorated. In addition, a surface condition of a part of the article where no skin material is laminated tends to be deteriorated. Thus, the clearance of the mold is adjusted to a suitable value based on the kinds of the materials, a shape of the molded article, etc.

The present invention further provides a process which comprises placing the skin material 3 with the surface up on the cavity surface of the lower mold 9, and supplying the resin melt 4 at or near the rear face of the skin material 3 through a passage (not shown) which is provided in the lower mold 9.

The skin material 3 is lifted by the resin melt 4 apart from the lower mold 9 and pressed to a predetermined part of the upper mold 8. In such a case, if supply balance of the resin melt is not adequate, the skin material tends to be displaced. Therefore, the clearance between the upper and lower molds during the supply of the resin melt is set narrower than the former process in which the resin melt is supplied from the passage provided in the upper mold 7.

Instead of supplying the resin melt 4 from the passage provided in the mold, the resin melt may be supplied from a resin passage which can inserted in and removed from the clearance between the upper and lower molds. However, this method is used only in a very limited case since it is very difficult to adjust the clearance of the mold during the resin supply as described above.

Since the skin material is hardly displaced as explained above, means for preventing displacement of the skin material is not necessarily used. However, it is still preferred to co-use means for preventing displacement of the skin material in order to more precisely position the skin material. As such the displacement preventing means, various means such as shown in FIG. 5 can be used. For example, as shown in FIG. 5A, the depth of the depression 10 is made substantially the same as the thickness of the skin material, as shown in FIG. 5B, a low wall 11 surrounding the skin material 3 is provided, as shown in FIG. 5C, a part of the mold on which the skin material is positioned is modified to form a telescopic element 13, which is pressed against the resin supply side by means of an expansion element 14 such as a spring, a hydraulic cylinder, a pneumatic cylinder and the like during the supply of the resin melt and being returned to the original position as the supply of the resin melt 4 proceeds, or in case where the skin material 3 is a fabric type one such as a fabric or a nonwoven fabric, the part of the mold on which the skin material is placed is provided with minute unevenness 12 as shown in FIG. 5D. In the case of FIG. 5D, not only the displacement of the skin material is prevented, but also the feeling of the skin material is maintained effectively.

To supply the resin melt 4 at or near the center area of the skin material 3, the resin melt may be supplied from at least two inlets for the resin melt and integrated with each other to reach the center area of the skin material, in addition to the above described method in which the resin melt is supplied from one point near the center area.

When the position at which the skin material 3 is placed on the article is deviated from the center of the article, in addition to the inlet provided near the center area of the rear face of the skin material, another inlet for supplying the resin melt 4 is provided at a position for balancing the flows of resin melt. In this case, it is important that the flows of the resin melts 4,5 do not meet each other on the skin material 3.

According to the present invention, the laminated molded article can be produced by lifting the skin material 3 by a vertically movable rod 16 or bar 17 which is provided in the lower mold 9 up to a position at which at least a part of the skin material 3 contacts with the cavity surface of the upper mold, thereafter supplying the resin melt 4 between the skin material 3 and the lower mold 9 and returning the rod 16 or the bar 17 to the original position at least before the molding is completed. By this method, since the skin material 3 is held by the rod 16 or the bar 17, it is hardly displaced and therefore, the resin melt 4 is not necessarily supplied at the center area of the rear face of the skin material.

The timing at which the rod 16 or the bar 17 is returned to the original position is any time after the start of resin melt supply and before the completion of molding. When plural number of the rods 16 and the bars 17 are used, it is not necessary to return all of them to their original positions at the same time.

In the process of the present invention, it is possible to use a mold which has a small wall 11 at a position of the lower mold 9 or the upper mold 7 corresponding to a boundary where the skin material 3 covers the thermoplastic resin 2 and a groove 15 which corresponds to the wall 11 on the upper mold 7 or the lower mold 9. In the multilayer molded article produced by using such mold, an edge portion of the adhered skin material is buried in the article so that a boundary between one part of the article which is covered by the skin material and an adjacent part of the article which is not covered by the skin material becomes distinct and the finishing of the article is improved. The skin material is hardly peeled off from its edge.

Examples of the skin material to be used in the present invention are fabrics, non-woven fabrics, metals, nets of thermoplastic resins, paper, metal foils and sheets or films of thermoplastic resins and thermoplastic elastomers. The skin material may be decorated by a rugged pattern such as embossing, print or dyeing, or in the form of a foam.

The skin material may be a laminated one consisting of at least two materials bonded by, for example, an adhesive. In use, the skin material can be preheated, for example, to improve adhesivity between the skin material and the resin.

As the resin to be used in the process of the present invention, any one of resins which are conventionally used in press molding, injection molding and extrusion molding can be used. Specific examples of the resin are non-expandable or expandable resins of thermoplastic resins (e.g. polypropylene, polyethylene, polystyrene, acrylonitrile-styrene-butadiene block copolymers, nylon, etc.) and thermoplastic elastomers (e.g. ethylene-propylene block copolymers, styrene-butadiene block copolymers, etc.). The resin may contain filler (e.g. inorganic fillers and glass fibers, etc.), pigments, lubricants, antistatic agents and the like.

PREFERRED EMBODIMENTS OF THE INVENTION

The present invention will be illustrated by following Examples, which will not limit the present invention.

EXAMPLE 1

Figure 1:
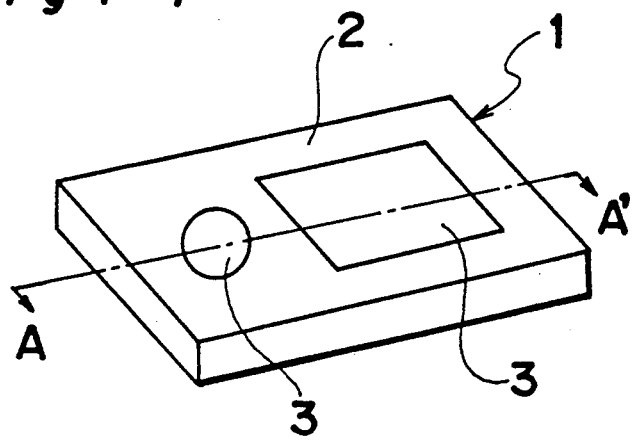
FIG. 1 shows a perspective view of a molded article produced by the process of the present invention.
Figure 2:
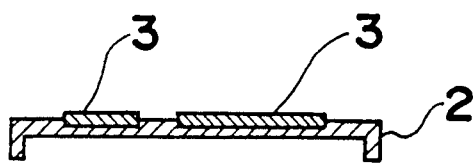
FIG. 2 shows a cross sectional view of the article of FIG. 1 along the line A—A'.
Figure 3:
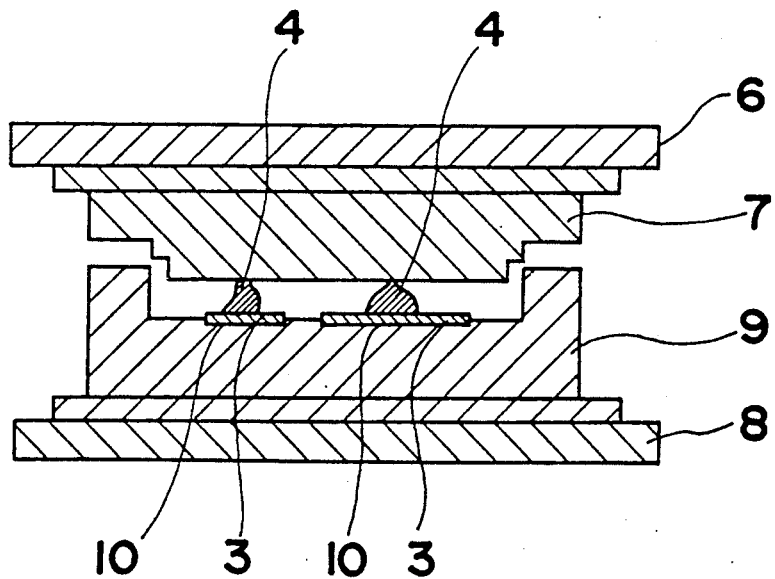
FIGS. 3 to 14 show vertical cross sectional views of apparatuses for explaining the process of the present invention.
Figure 4:
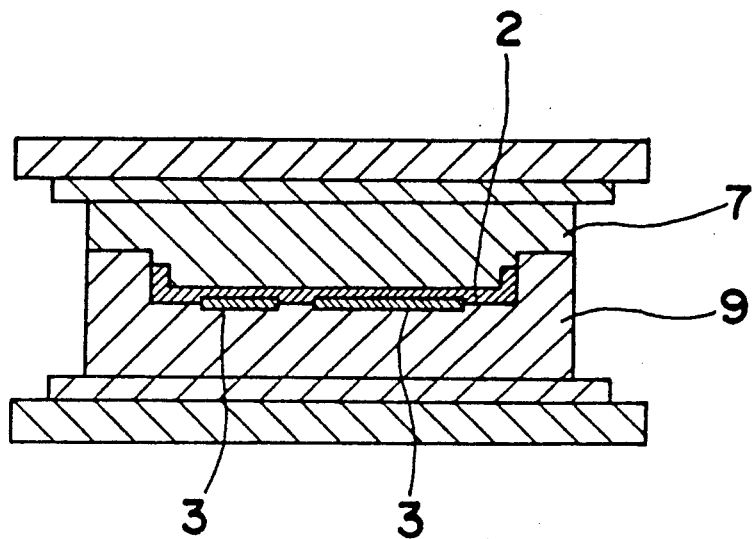
Figure 5A:
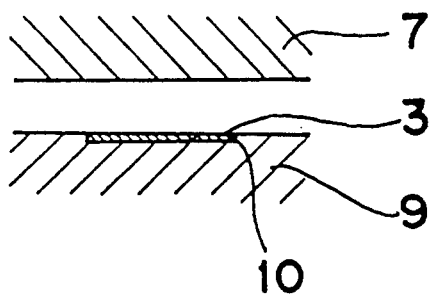
Figure 5B:
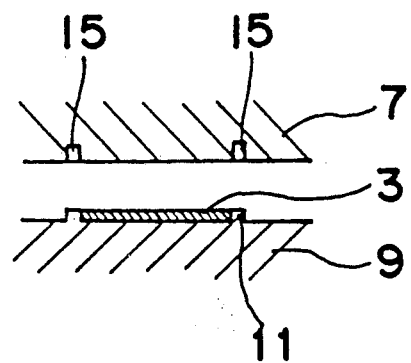
Figure 5C:
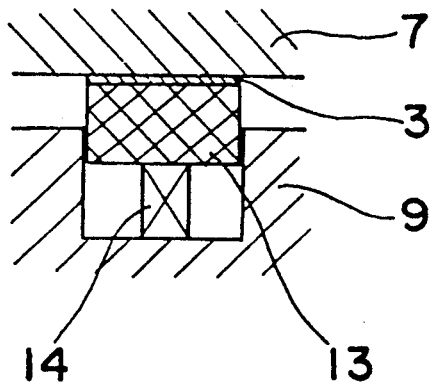
Figure 5D:
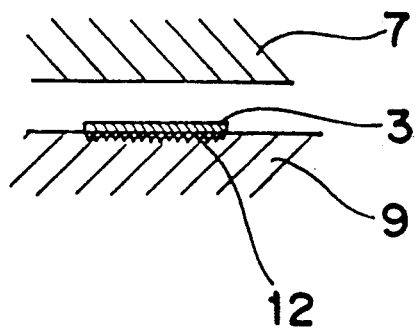

By using a molding equipment in which the upper mold 7 had a passage and an inlet for supplying the resin melt 4, a multilayer molded article was produced by following steps i) to iv):

i) Two pieces of a skin material cut to desired sizes (a composite material made of a embossing sheet of polyvinyl chloride having a thickness of 0.6 mm and a sheet of polypropylene foam having a thickness of 3 mm and an expansion ratio of 15) were placed with their surfaces down on the depressions 10 of the lower mold 9.

ii) The lifting mechanism (not shown) of the mold closing machine was actuated to lift the lower mold 9, and then the lower mold 9 was stopped at a position where the clearance between the cavity surfaces of the upper and lower molds 7 and 9 was 30 mm. At that position, the resin melt kept at 200° C. (Sumitomo Noblen (registered trade mark) AZ 564, polypropylene manufactured by Sumitomo Chemical Company Limited) was supplied at or near the center area of the rear face of each skin material 3 through the resin passage (not shown) provided in the upper mold 7 (FIG. 3).

iii) Thereafter, the lifting mechanism was reactuated to further lift the lower mold 9 at a rate of 10 mm/sec. so as to press the skin material 3 against the lower mold 9. Then, the resin melt 4 was spread in the mold cavity, whereby the skin material 3 and the thermoplastic resin 2 were integrated and the molding was completed (FIG. 4).

iv) After cooling the mold, the lower mold 9 was lowered to open the upper and lower molds, and then the molded article 1 having a thickness of 3 mm was removed from the mold.

The produced article 1 had no displacement of the skin material and good feeling.

EXAMPLE 2

Figure 6:
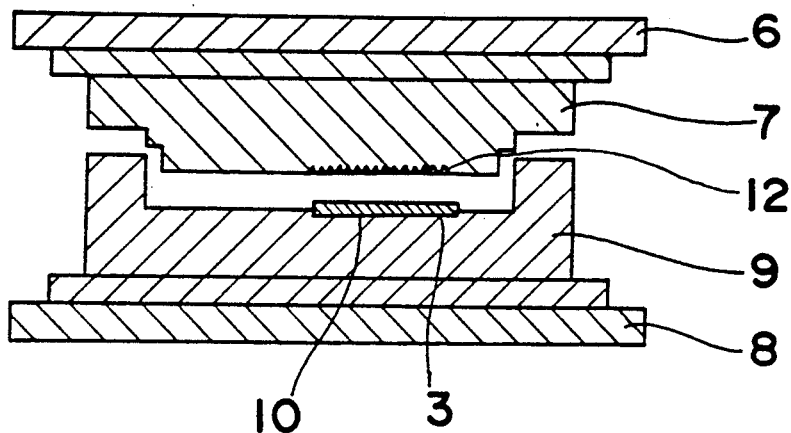
Figure 7:
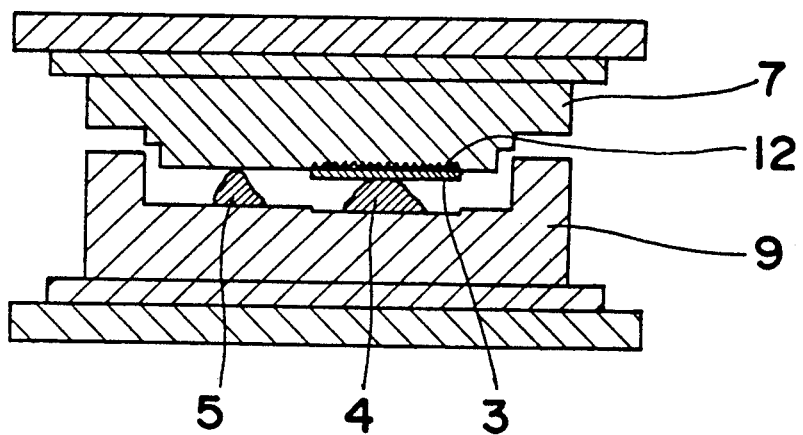
Figure 8:
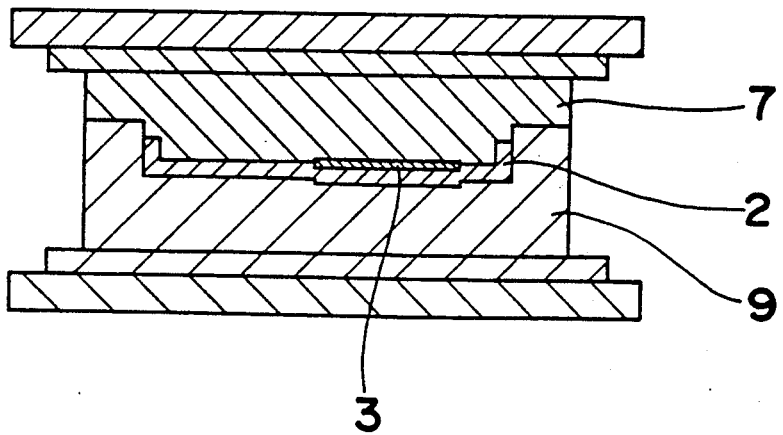

By using a molding equipment in which the lower mold 9 had passages and inlets for supplying the resin melt 4,5, a multilayer molded article 1 was produced by following steps i) to iv):

i) Two pieces of a skin material 3 cut to desired sizes (a non-woven fabric of polyester having an average weight (METSUKE) of 300 g/m$^2$) were placed with their surfaces up on the depressions 10 of the lower mold 9.

ii) The lifting mechanism (not shown) of the mold closing machine was actuated to lower the upper mold 7, and then the upper mold 7 was stopped at a position where the clearance between the cavity surfaces of the upper and lower molds 7 and 9 was 10 mm (FIG. 6). At that position, the resin melt kept at 200° C. (Sumitomo Noblen (registered trade mark) AZ 564, polypropylene manufactured by Sumitomo Chemical Company Limited) was supplied at or near the center area of the rear face of each skin material 3 through the resin passage (not shown) provided in the lower mold 9. To balance the resin melt flow, another portion of the resin melt 5 was supplied from the other inlet. Each skin material 3 was lifted by the resin melt 4 from the lower mold 9 and pressed against the respective predetermined part of the upper mold 7 having minute unevenness.

iii) Thereafter, the lifting mechanism was reactuated to further lower the upper mold 7 at a rate of 20 mm/sec. so as to spread the resin melt 4,5 in the mold cavity with pressing the skin material, whereby the skin material 3 and the thermoplastic resin 2 were integrated and the molding was completed (FIG. 8).

iv) After cooling the mold, the upper mold 7 was lifted to open the upper and lower molds, and then the molded article having a thickness of 3 mm was removed from the mold.

The produced article 1 had no displacement of the skin material and good feeling.

COMPARATIVE EXAMPLE 1

Under the same conditions as in Example 2 but supplying the resin melt 4 at an edge part of the rear face of the skin material from a passage provided in the lower mold 9, a multilayer molded article was produced.

On the produced article, the skin material was displaced from the intended position.

COMPARATIVE EXAMPLE 2

Under the same conditions as in Example 2 but injection supplying the resin melt with applying a predetermined clamrodg force after closing the upper and lower molds 7,9 to the finally closed position (conventional injection molding), a multilayer molded article was produced.

Although the produced article had no displacement of the skin material, the resin penetrated into the skin material 3 so the article had very poor touch.

EXAMPLE 3

Figure 9:
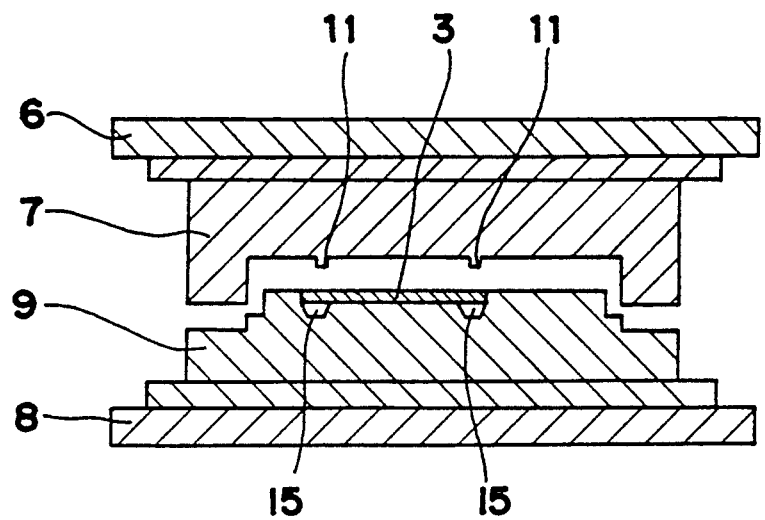
Figure 10:
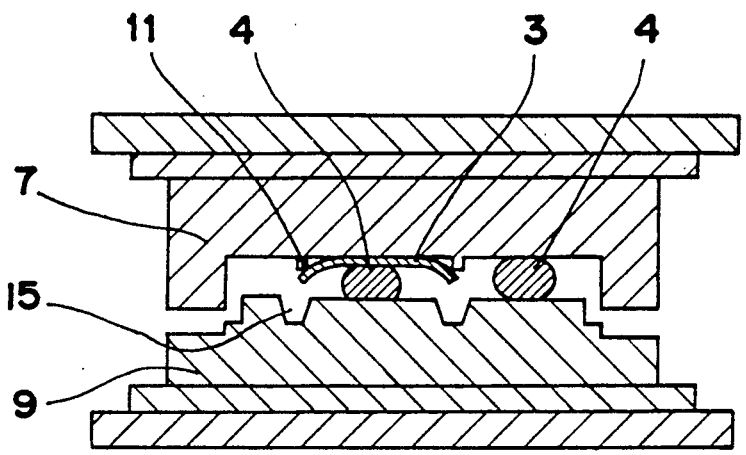
Figure 11:
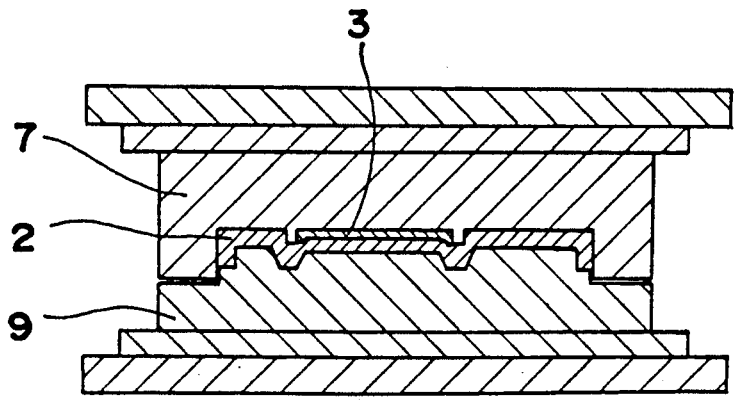

Under the same conditions as in Example 2 but using a mold in which a small wall was provided on the cavity surface of the upper mold 7 at a position corresponding a boundary where the skin material 3 covers the thermoplastic resin 2, and a groove 15 was provided on the cavity surface of the lower mold 9 at a position corresponding to the small wall, a multilayer molded article was produced (FIGS. 9-11).

In the produced multilayer molded article, the boundary between the part covered with the skin material and the adjacent part not covered with the skin material was clear and the feeling was good.

EXAMPLE 4

Figure 12:
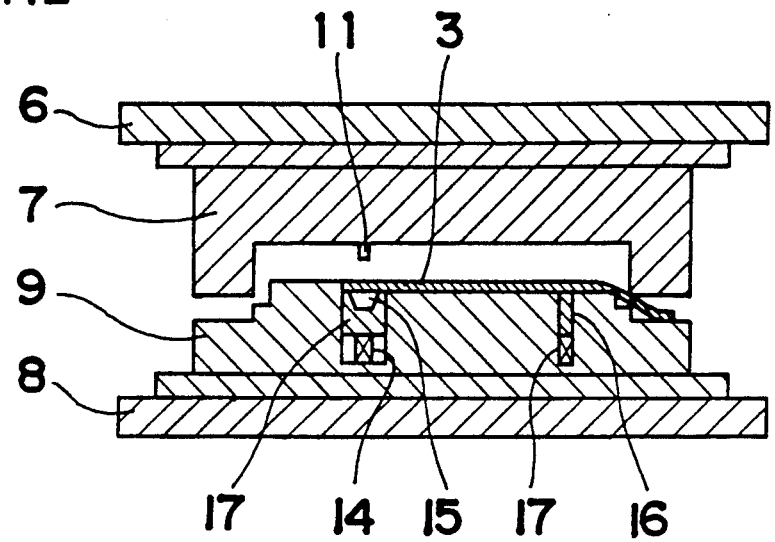
Figure 13:
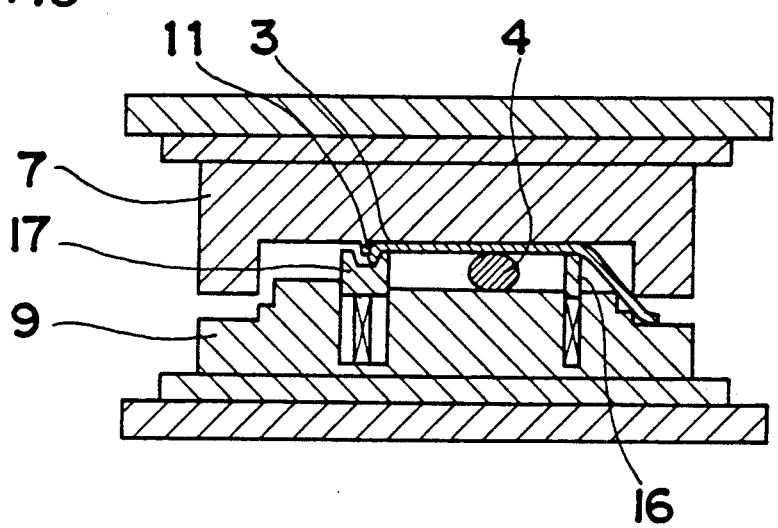
Figure 14:
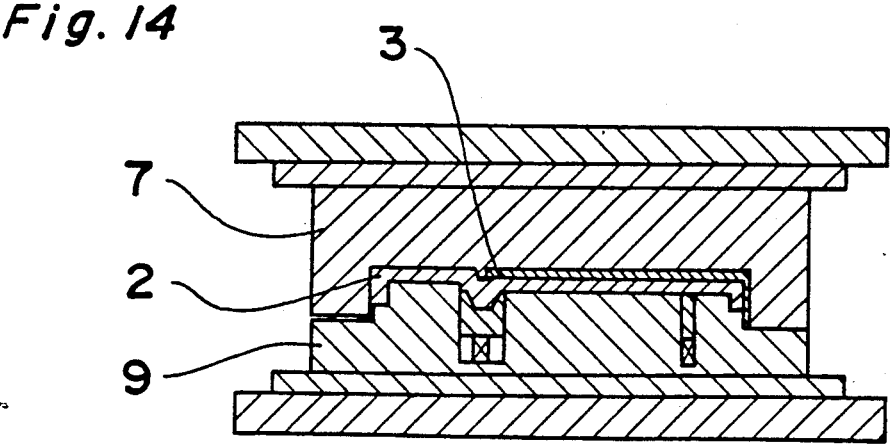

By using a molding equipment comprising a mold in which a small wall 11 was provided on the cavity surface of the upper mold 7 at a position corresponding a boundary where the skin material 3 covers the thermoplastic resin 2, a groove 15 was provided on the cavity surface of the lower mold 9 at a position corresponding to the small wall, a vertically movable rod 16 and bar 17 and a passage and an inlet for supplying the resin melt 4 were provided in the lower mold 9, a multilayer molded article was produced by following steps i) to v):

i) A piece of a skin material 3 cut to a desired size (a composite material made of a embossing sheet of polyvinyl chloride having a thickness of 0.6 mm and a fabric of wooly nylon having a thickness of 0.2 mm) was placed with its surface up along the groove 15 of the lower mold 9.

ii) The lifting mechanism (not shown) of the mold closing machine was actuated to lower the upper mold 7, and then the upper mold 7 was stopped at a position where the clearance between the cavity surfaces of the upper and lower molds 7 and 9 was 15 mm (FIG. 12). At that position, the rod 16 and the bar 17 were moved upwardly to lift the skin material 3 so that the skin material slightly touched a predetermined part of the cavity surface of the upper mold.

iii) Under such condition, the resin melt kept at 240° C. (Klarastic (registered trade mark) MTH-2, an ABS resin manufactured by Sumitomo Naugatuck Company Limited) was supplied at two areas of the surface of the skin material 3 through the resin passages provided in the lower mold 9 (FIG. 13). After 0.5 and 1.0 second from the start of resin supply, the pin 16 and the bar 17 were lowered to the original positions, respectively.

iv) Thereafter, the lifting mechanism was reactuated to further lower the upper mold at a rate of 15 mm/sec. so as to spread the resin melt in the mold cavity with pressing the skin material 3, whereby the skin material 3 and the thermoplastic resin 2 were integrated and the molding was completed (FIG. 14).

v) After cooling the mold, the upper mold 7 was lifted to open the upper and lower mold, and then the molded article 1 having a thickness of 3 mm was removed from the mold.

The produced article 1 had no displacement of the skin material and good feeling.

what is claimed is:

1. A process for producing a multilayer molded article which comprises:

supplying at least one piece of a skin material and then a resin melt between unclosed upper and lower molds, wherein the resin melt is supplied after temporarily stopping the closing of the molds or decreasing the mold closing rate to 30 mm/sec. or less, and wherein a cavity clearance between the upper and lower molds is not larger than (C+100)mm and not smaller than (C+5)mm wherein C represents cavity clearance between the molds when the molding process is completed; and then closing the molds to spread the resin melt and form the multilayer molded article comprising a resin and the skin material which covers only a part of the surface of the article, wherein the skin material is placed at a predetermined skin material position on one of the lower or upper molds to prevent displacement of the skin material due to spreading the resin melt, and the resin melt is supplied at or near a center area of an outward face of the skin material, wherein said predetermined position is a structure selected from the group consisting of a depression in the mold, a boundary wall on the mold, a telescopic element in the mold and an uneven surface area in the mold.

2. A process for producing a multilayer molded article which comprises:

supplying a piece of skin material and then a resin melt between unclosed upper and lower molds, wherein the resin melt is supplied after temporarily stopping the closing of the molds or decreasing the mold closing rate to 30 mm/sec. or less, and wherein a cavity clearance between the upper and lower molds is not larger than (C+100)mm and not smaller than C+5)mm wherein C represents cavity clearance between the molds when the molding process is completed; and then closing the molds to spread the resin melt and form the multilayer molded article comprising a resin and the skin material which partially covers the article surface, wherein a vertically movable rod or bar is provided at a part of the lower mold on which the skin material is positioned, and after lifting the skin material to a position at which at least a part of the skin material contacts a cavity surface of the upper mold by the rod or bar, supplying the resin melt between the skin material and the lower mold and returning the lower mold and the rod or bar to a determined position at least before the molding is completed to prevent displacement of the skin material due to spreading the resin melt.

3. The process according to claim 1, wherein the lower mold or the upper mold includes a boundary wall at the predetermined skin material position corresponding to a boundary where the skin material covers the resin and at least a groove which corresponds to the wall on the upper opposing mold.

4. The process according to claim 1, wherein the upper or lower mold includes a depression defined therein at the predetermined skin material position for positioning the skin material, said depression having a depth substantially the same as the thickness of the skin material.

5. The process according to claim 1, wherein the upper or lower mold includes a telescopic element at the predetermined skin material position for positioning the skin material thereon, said telescopic element being operatively connected to an expansion element for pressing the skin material against the resin melt.

6. The process according to claim 5, wherein said expansion element is a member selected from the group consisting of a spring, a hydraulic cylinder and a pneumatic cylinder.

7. The process according to claim 1, wherein the upper or lower mold includes an uneven surface area at the predetermined skin material position for positioning the skin material thereon and preventing displacement of the skin material during the process.

8. The process according to claims 1 or 2, wherein the skin material is selected from the group consisting of fabrics, non-woven fabrics, metals, nets of thermoplastic resins, paper, films of thermoplastic resins and films of thermoplastic elastomers.

9. The process according to claims 1 or 2, wherein the resin is a thermoplastic selected from the group consisting of polypropylene, polyethylene, polystyrene, acrylonitrile-styrene-butadiene block copolymers, and nylon.

10. The process according to claim 2, wherein the lower mold includes a boundary wall at the predetermined skin material position corresponding to a boundary where the skin material covers the resin and at least a groove which corresponds to the wall on the upper opposing mold.

11. The process according to claims 1 or 2, wherein the resin is an elastomer selected from a group consisting of ethylene-propylene block copolymers and styrene-butadiene block copolymers.

* * * * *